US012639265B2

(12) United States Patent　　　(10) Patent No.:　US 12,639,265 B2

Cho et al.　　　　　　　　　　　　(45) Date of Patent:　May 26, 2026

(54) METHOD FOR MAINTAINING META INFORMATION OF SECURE DOCUMENT, APPARATUS FOR THE SAME, COMPUTER PROGRAM FOR THE SAME, AND RECORDING MEDIUM STORING COMPUTER PROGRAM THEREOF

(71) Applicant: Fasoo Co., Ltd, Seoul (KR)

(72) Inventors: Kyu Gon Cho, Gyeonggi-do (KR); Jin Seok Um, Seoul (KR)

(73) Assignee: Fasoo Co., Ltd, Seoul (KR)

( * ) Notice: Subject to any disclaimer, the term of this patent is extended or adjusted under 35 U.S.C. 154(b) by 5 days.

(21) Appl. No.: 18/339,110

(22) Filed: Jun. 21, 2023

(65) Prior Publication Data

US 2023/0418786 A1　　　Dec. 28, 2023

(30) Foreign Application Priority Data

Jun. 22, 2022　　(KR) ........................ 10-2022-0076222

(51) Int. Cl.
　　*G06F 17/00*　　　　(2019.01)
　　*G06F 16/11*　　　　(2019.01)
　　*G06F 16/16*　　　　(2019.01)
(52) U.S. Cl.
　　CPC ............ *G06F 16/164* (2019.01); *G06F 16/11* (2019.01)
(58) Field of Classification Search
　　CPC ...... G06F 16/164; G06F 16/11; G06F 16/122; G06F 21/10; G06F 21/6218; G06F 21/6209; G06F 21/16
　　See application file for complete search history.

(56) References Cited

U.S. PATENT DOCUMENTS 9,773,121　B2 *　9/2017　Leemet ............... G06F 21/6227
2005/0203935　A1　9/2005　McArdle
　　　　　　　(Continued)

FOREIGN PATENT DOCUMENTS

JP　　　2004192355　A　　7/2004
JP　　　2005025350　A　　1/2005
　　　　　　(Continued)

OTHER PUBLICATIONS

Dominic Tsang et al., A robust index for regular expression queries. In Proceedings of the 20th ACM international conference on Information and knowledge management. Association for Computing Machinery, 2365-2368, <https://doi.org/10.1145/2063576.2063968>, Oct. 2011.*

(Continued)

*Primary Examiner* — Greta L Robinson

(74) *Attorney, Agent, or Firm* — Morgan, Lewis & Bockius LLP

(57)　　　　　ABSTRACT

This application describes a method, a device, and a computer readable recording medium for maintaining meta information of a secure document. The method may be performed by identifying a reading target document and acquiring information of the reading target document, identifying a window of a program where the reading target document is read and acquiring information of the window, mapping information of the reading target document and information of the window by using a regular expression for the program, mapping meta information of a secure document and the reading target document based on information of the reading target document and mapping meta information of the secure document mapped to the reading target document to a new document created from the reading target document.

12 Claims, 3 Drawing Sheets

(56)     References Cited

U.S. PATENT DOCUMENTS

| | | |
|---|---|---|
| 2008/0040388 A1 | 2/2008 | Petri et al. |
| 2008/0072225 A1 | 3/2008 | Nagatsuka et al. |
| 2008/0082478 A1* | 4/2008 | Nonomura ............ G06F 16/835 |
| 2013/0212707 A1* | 8/2013 | Donahue ............. G06F 21/6218 |
| | | 726/29 |
| 2013/0262864 A1 | 10/2013 | Hamid |
| 2017/0091469 A1* | 3/2017 | Leemet ............... G06F 21/6218 |
| 2018/0012036 A1* | 1/2018 | Leemet ................... G06F 21/80 |
| 2018/0063182 A1* | 3/2018 | Jones ................. H04L 63/1433 |

FOREIGN PATENT DOCUMENTS

| | | |
|---|---|---|
| JP | 2006180262 A | 7/2006 |
| JP | 2008072379 A | 3/2008 |
| JP | 2008102911 A | 5/2008 |
| JP | 2008140273 A | 6/2008 |
| JP | 2010086225 A | 4/2010 |
| JP | 2020047222 A | 3/2020 |
| KR | 101064143 B1 | 9/2011 |
| KR | 20180116974 A | 10/2018 |
| KR | 20200079822 A | 7/2020 |

OTHER PUBLICATIONS

Fasoo Co., Ltd, Extended European Search Report, EP Patent Application No. 23179728.3, Nov. 8, 2023, 8 pgs.
Fasoo Co., Ltd, Korean Office Action, KR Patent Application No. 10-2022-0076222, Apr. 17, 2024, 11 pgs.
Fasoo Co., Ltd, Japanese Office Action, JP Patent Application No. 2023-102071, Jul. 5, 2024, 6 pgs.

* cited by examiner

FIG.2

```
sldworks.exe.config
{
  "process": "sldworks.exe",
  "content": [
    {
      "regex": [
        "SOLIDWORKS Premium 2018 SP5W.0 - ([^WWWW/:WW*WW?W"<>WW|]+)"
      ],
      "target": "afx:"
    },
    {
      "target": "afx:",
      "parent": [
        "MDIClient",
        "afx:"
      ],
      "regex": [
        "([^WWWW/:WW*WW?W"<>WW|]+)",
        "([^WWWW/:WW*WW?W"<>WW|]+)d"
      ]
    }
  ]
}
```

FIG.3

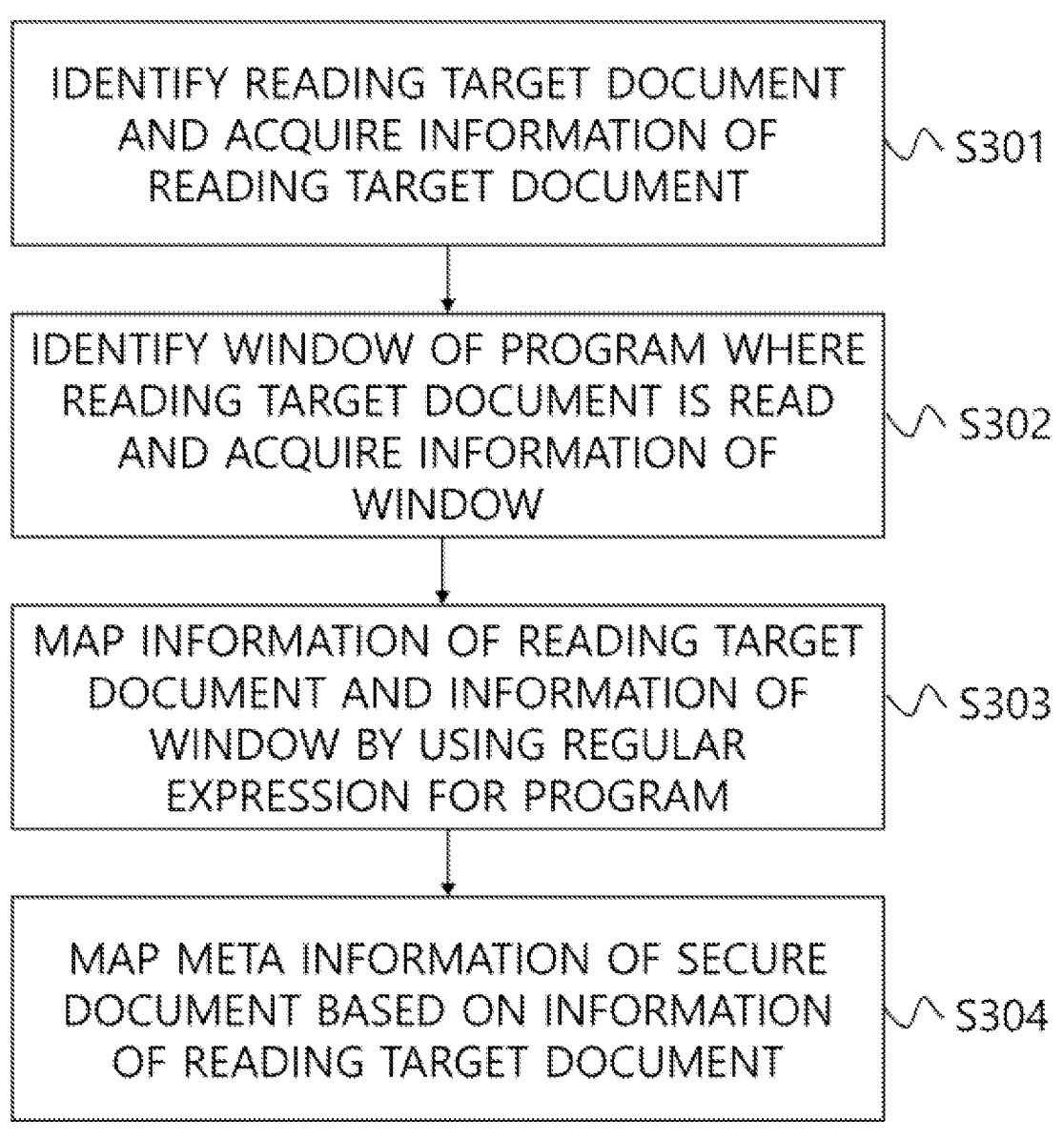

IDENTIFY READING TARGET DOCUMENT AND ACQUIRE INFORMATION OF READING TARGET DOCUMENT    ⌇⌃ S301

IDENTIFY WINDOW OF PROGRAM WHERE READING TARGET DOCUMENT IS READ AND ACQUIRE INFORMATION OF WINDOW    ⌇⌃ S302

MAP INFORMATION OF READING TARGET DOCUMENT AND INFORMATION OF WINDOW BY USING REGULAR EXPRESSION FOR PROGRAM    ⌇⌃ S303

MAP META INFORMATION OF SECURE DOCUMENT BASED ON INFORMATION OF READING TARGET DOCUMENT    ⌇⌃ S304

METHOD FOR MAINTAINING META INFORMATION OF SECURE DOCUMENT, APPARATUS FOR THE SAME, COMPUTER PROGRAM FOR THE SAME, AND RECORDING MEDIUM STORING COMPUTER PROGRAM THEREOF

CROSS-REFERENCE TO RELATED APPLICATIONS

This application claims the benefit of earlier filing date and right of priority to Korean Application No. 10-2022-0076222, filed on Jun. 22, 2022, the contents of which are all hereby incorporated by reference herein in their entirety.

TECHNICAL FIELD

The present disclosure relates to a method, a device, a computer program and a recording medium for maintaining meta information of a secure document, and in more detail, relates to a method, a device, a computer program and a recording medium for maintaining meta information of a secure document by automatically applying Digital Rights Management (DRM) to a CAD program and generalizing a document storage form.

BACKGROUND

From the past, there has been a continuous discussion and demand for the need for CAD drawing security. Then, as security threat and internal data hacking attack due to telecommuting has accelerated, introduction of a DRM solution has increased. For the manufacturing business, as collaboration between an ordering body, a partner, etc. becomes very active, an important drawing is frequently leaked during collaboration for drawing design and then, it is required to strengthen security therefor, increasing an interest in DRM more and more.

In the past, for security of a CAD drawing or a document, a kernel method which causes overall degradation of a system or the existing application hooking method which requires additional development for each CAD program has been used.

BRIEF SUMMARY

A method of controlling security of a document by a kernel method has a problem of degrading the whole system. A method of controlling security of a document by using a hooking method for each CAD program has a problem of requiring lots of development time and expenses because a separate security program needs to be developed for each CAD program and a security program needs to be continuously updated whenever each CAD program is updated.

Accordingly, the present disclosure proposes a method, a device, a computer program and a recording medium for controlling security of a document regardless of a type and a version of a CAD program.

A method, a device and a computer readable recording medium for maintaining meta information of a secure document according to an embodiment of the present disclosure may include identifying a reading target document and acquiring information of the reading target document, identifying a window of a program where the reading target document is read and acquiring information of the window, wherein information of the window includes a caption name of the window, mapping information of the reading target document and information of the window by using a regular expression for the program, mapping meta information of a secure document and the reading target document based on information of the reading target document and mapping meta information of the secure document mapped to the reading target document to a new document created from the reading target document.

In a method, a device and a computer readable recording medium for maintaining meta information of a secure document according to an embodiment of the present disclosure, information of the reading target document includes key information and the kew information may be any one of a window handle or a full path of the reading target document.

In a method, a device and a computer readable recording medium for maintaining meta information of a secure document according to an embodiment of the present disclosure, mapping between information of the reading target document and information of the window may be performed by comparing the key information with information acquired by applying the regular expression to a caption name of the window.

In a method, a device and a computer readable recording medium for maintaining meta information of a secure document according to an embodiment of the present disclosure, mapping between meta information of the reading target document and the secure document may be performed by comparing meta information of the secure document with a window handle of the reading target document or a full path of the reading target document.

In a method, a device and a computer readable recording medium for maintaining meta information of a secure document according to an embodiment of the present disclosure, mapping between meta information of the reading target document and the secure document may be performed only when the reading target document is determined as a management target, and whether the reading target document is the management target may be determined based on at least one of information of the reading target document or information of the window.

In a method, a device and a computer readable recording medium for maintaining meta information of a secure document according to an embodiment of the present disclosure, when there is no regular expression for the program, a regular expression for the program may be generated by using information of the reading target document and information of the window.

In a method, a device and a computer readable recording medium for maintaining meta information of a secure document according to an embodiment of the present disclosure, identification of the reading target document is performed by any one of a plurality of identification methods, the plurality of identification methods include a first identification method, a second identification method and a third identification method, the first identification method may identify the reading target document based on any one of a Commandline Parameter, a Dynamic Data Exchange (DDE) Parameter, a DragFile or a Common Dialog, the second identification method may identify the reading target document based on a currently open document and the third identification method may identify a reading target document based on a document read up to now.

In a method, a device and a computer readable recording medium for maintaining meta information of a secure document according to an embodiment of the present disclosure, the first identification method may have a first priority, the second identification method may be a method having a second priority performed when the reading target document is not identified by the first identification method having the first priority, and the third identification method may be a method having a third priority performed when the reading target document is not identified by the second identification method having the second priority.

In a method, a device and a computer readable recording medium for maintaining meta information of a secure document according to an embodiment of the present disclosure, when the new document is created from the reading target document, tracking information of the reading target document may be updated and tracking information may be created in information of the new document.

In a method, a device and a computer readable recording medium for maintaining meta information of a secure document according to an embodiment of the present disclosure, the new document may be a document created by saving, saving as another name or exporting the reading target document.

A method, a device and a computer program and a recording medium for maintaining meta information of a secure document of the present disclosure are not a kernel method of causing degradation of the whole system or a hooking method in which development and update are required per program, and they support a variety of programs simultaneously through a regular expression, which has an effect of reducing development time and expenses.

Since a method, a device and a computer program and a recording medium for maintaining meta information of a secure document of the present disclosure support a variety of CAD programs, security of a document of a variety of programs may be controlled by only one method, device, computer program and recording medium for maintaining meta information of a secure document of the present disclosure without the need for each user to install a security program suitable for a program one by one. As a result, maintenance and management are simplified, so work efficiency of an administrator and a user may be improved.

A method, a device and a computer program and a recording medium for maintaining meta information of a secure document of the present disclosure may generalize a file storage form of a reading target document by utilizing a function including saving/exporting a file and map meta information of a secure document mapped to a reading target document to a document created from a reading target document to maintain meta information of a secure document.

DESCRIPTION OF DRAWINGS

FIG. 2 is a diagram representing an embodiment of a regular expression.

FIG. 3 is a flowchart for a method of maintaining meta information of a secure document according to an embodiment of the present disclosure.

DETAILED DESCRIPTION

Figure 1:
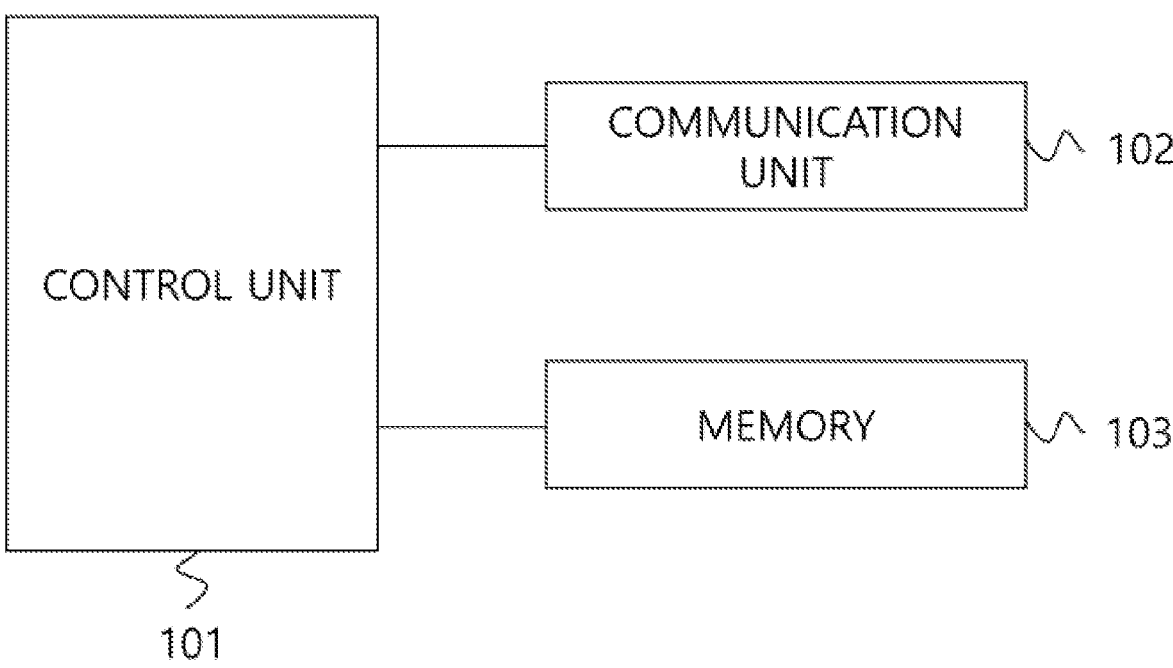
FIG. 1 is a diagram representing a configuration of a device which maintains meta information of a secure document according to an embodiment of the present disclosure.

Hereinafter, embodiments of the present invention will be described in detail so that those skilled in the art can easily carry out the present invention referring to the accompanying drawings. However, the present disclosure may be embodied in many different forms and is not limited to the embodiments described herein.

In the following description of the embodiments of the present invention, a detailed description of known functions and configurations incorporated herein will be omitted when it may make the subject matter of the present disclosure unclear. Parts not related to the description of the present disclosure in the drawings are omitted, and similar parts are denoted by similar reference numerals.

In the present disclosure, when an element is referred to as being "connected", "coupled", or "accessed" to another element, it is understood to include not only a direct connection relationship but also an indirect connection relationship. Also, when an element is referred to as "containing" or "having" another element, it means not only excluding another element but also further including another element.

In the present disclosure, the terms "first", "second", and so on are used only for the purpose of distinguishing one element from another, and do not limit the order or importance of the elements unless specifically mentioned. Thus, within the scope of this disclosure, the first component in one embodiment may be referred to as a second component in another embodiment, and similarly a second component in one embodiment may be referred to as a second component in another embodiment.

In the present disclosure, components that are distinguished from one another are intended to clearly illustrate each feature and do not necessarily mean that components are separate. That is, a plurality of components may be integrated into one hardware or software unit, or a single component may be distributed into a plurality of hardware or software units. Accordingly, such integrated or distributed embodiments are also included within the scope of the present disclosure, unless otherwise noted.

In the present disclosure, the components described in the various embodiments do not necessarily mean essential components, but some may be optional components. Accordingly, embodiments consisting of a subset of the components described in one embodiment are also included within the scope of this disclosure. Also, embodiments that include other components in addition to the components described in the various embodiments are also included in the scope of the present disclosure.

In the present disclosure, a program may represent a CAD program.

FIG. 1 is a diagram representing a configuration of a device which maintains meta information of a secure document according to an embodiment of the present disclosure.

A device of maintaining meta information of a secure document may include a control unit 101, a communication unit 102 and a memory 103.

A control unit 101 may acquire information of a reading target document by identifying a reading target document.

Here, a reading target document may represent a document which is read by executing a reading or writing event for the document. Specifically, a reading target document may include a document which is read by a command executed when a process is created, a document which is read through a dynamic data exchange (DDE) window message, a document which is read through drag and drop, etc.

A document which is read through drag and drop may be a document which is read through a command of dragging a document icon and dropping it onto an icon of a program capable of reading the document or a window of the program. But, it is just one embodiment, and a document which is read through drag and drop may include a document which is read only by drag, a document which is read by drag-over, a document which is read by drag-leave, etc.

Information of a reading target document may include at least one of a name, key information, or tracking information of a reading target document.

As key information is information which helps distinguish between a corresponding reading target document and other document, it may include at least one of a window handle or a full path of a document. Here, a window handle may be a document-specific integer value allocated by a window when a reading target document is created.

Information of a reading target document may be at least one of information stored in a document itself or information retrieved from a database connected through key information of a document. The database may be stored in a memory 103 or a server.

Information of a reading target document may be used for mapping between information of a window of a program that a reading target document is read and information of a reading target document. In addition, information of a reading target document may be used to create a regular expression of a program.

A method of identifying a reading target document may have a priority. Specifically, a method of identifying a reading target document with a first priority may identify a reading target document based on at least one of a Commandline Parameter, a Dynamic Data Exchange (DDE) Parameter, a DragFile or a Common Dialog. When a reading target document may not be identified by a method of identifying a reading target document with a first priority, a reading target document may be identified by a method of identifying a reading target document with a second priority. A method of identifying a reading target document with a second priority may identify a reading target document based on a currently open file. When a reading target document may not be identified by a method of identifying a reading target document with a second priority, a reading target document may be identified by a method of identifying a reading target document with a third priority. A method of identifying a reading target document with a third priority may identify a reading target document based on a file read up to now.

A method of identifying a reading target document based on a commandline parameter may be performed by transmitting a path of a corresponding document when a document is opened by a command when a process is created. Here, a command for opening a document may be a command input by a user with a keyboard, etc. or a command input automatically when a process is created.

A method of identifying a reading target document based on a dynamic data exchange (DDE) parameter may be performed by transmitting a path of a document which is opened through a DDE Window Message. Here, a DDE Window Message may be generated by one-time or periodic data exchange with an operating system or other program (including a CAD program). Here, Window is just an example of an operation system and a reading target document may be also identified by a message which performs a function equal or similar to a DDE Window Message of other operating system.

A method of identifying a reading target document based on DragFile may be performed by transmitting a path of a document which is opened through Drag and Drop. But, it is just one embodiment, and a document which is opened through Drag and Drop may include a document which is opened only by drag, a document which is opened by drag-over, a document which is opened by drag-leave, etc.

A method of identifying a reading target document based on Common Dialog may be performed by using a Common Dialog window which is opened when executing a function such as save, save as, export, etc. In this case, a path of a document stored by a function such as save, save as, export, etc. may be transmitted.

A control unit 101 may identify a window of a program that a reading target document is opened to acquire information of the window.

Here, information of a window may include a caption name of a window or information acquired from a caption name of a window. In an example, when an event that a caption of a window is changed occurs, a caption name of a window may be acquired as information of a window. Here, an event that a caption of a window is changed may include an event that a caption of a program window is changed by a WM_SETTEXT message among window messages.

As a CAD program is generally a program in a Multiple Document Interface (MDI) structure, multiple documents may be read in one program (or process). Accordingly, it is required to identify a window which is read per document. In other words, when a plurality of documents are read, which window is read for each of the plurality of documents may be identified.

A control unit 101 may map information of a reading target document and information of a window of the program by using a regular expression of a program that a reading target document is read.

A regular expression of a program may be created one by one per program. When there is no regular expression of a program that a reading target document is read, a regular expression may be created by using information of a reading target document and information of a window of a program. The created regular expression may be stored in a memory 103 or may be stored in a server through a communication unit 102.

For a CAD program, an indication form of a caption name may be different per program. In an example, for an Auto-CAD program, when a document is test.dwg, a caption name of a window of a program may be indicated as test.dwg. For a CATIA program, when a document is test.dwg, a caption name of a window of a program may be indicated as Catia—test.dwg—document. As such, in some cases, an extension of a reading target document may be removed and indicated per program and in other cases, it may be indicated as a full file path of a reading target document, not a document name of a reading target document. In other words, according to a window of a CAD program used to read a reading target document, a caption name of a window of the program may be different. Accordingly, in order to save management time and expenses, the present disclosure may generalize (or normalize) information of a window of a program into a regular expression.

In other words, a control unit 101 may generalize (or normalize) information of a window of a program by applying a regular expression defined per program to information of a window of a program (e.g., a caption name). Accordingly, mapping information of a reading target document and information of a window of a program may represent mapping information of a reading target document and information of a window of a generalized (or normalized) program.

In an example, for a CATIA program, a caption of a window of a program is indicated as 'Catia—test.dwg—document', so test.dwg in the middle may be mapped to a document name and an extension of a reading target document. In other words, only part of a caption of a window may be extracted and mapped to information of a reading target document.

FIG. 2 is a diagram representing an embodiment of a regular expression.

As such, as a regular expression applied per program is different, a control unit 101, before applying a regular expression, may confirm a type of a program that a reading target document is read and transmit information (an index number) of a regular expression corresponding to a confirmed program to a server through a memory 103 or a communication unit 102. In response to the transmission, a control unit 101 may acquire a regular expression corresponding to information (an index number) of the regular expression of a regular expression list including a plurality of regular expressions stored in a memory 103 or a server from a memory 103 or a server.

In another example, a control unit 101 may acquire a regular expression corresponding to the regular expression information of a regular expression list stored in a server from a server through a communication unit 102 only when there is no regular expression corresponding to the regular expression information of a regular expression list stored in a memory 103. However, when there is also no regular expression corresponding to the regular expression information in a server, a control unit 101 may create a regular expression for a corresponding program.

A control unit 101 may map meta information of a secure document to a reading target document based on information of a reading target document.

Here, the mapping may be performed only when a reading target document is determined as a management target. Whether it is a management target may be determined based on management target information stored in a memory 103 or acquired from a server through a communication unit 102. Specifically, when all or part of information of a reading target document matches management target information, a reading target document may be determined as a management target. Alternatively, when all or part of information of a window of a program matches management target information, a reading target document may be determined as a management target. For example, when a writer of a reading target document is included in an ID list of management target information, when a document name of management target information matches a document name of a reading target document, or when a specific keyword of management target information is included in a document name of a reading target document, a reading target document may be determined as a management target.

When it is determined that a reading target document is not a management target, mapping between meta information of a reading target document and a secure document may not be performed.

Meta information of a secure document may include at least one of a company unique ID, a document unique ID, a document creation time, creator/owner information, rating information (authority), or encryption information (key/algorithm).

Mapping between meta information of a reading target document and a secure document may be performed by mapping a window handle of a reading target document and meta information of a secure document or may be performed by mapping a full path of a reading target document and meta information of a secure document. As described above, a window handle of a reading target document and a full path of a reading target document may be key information of a reading target document.

When a new document is created from a reading target document, a control unit 101 may map meta information of a secure document mapped to a reading target document and a new document.

A new document created from a reading target document may include a document created by performing a function such as saving, saving as, saving, exporting, etc. a reading target document in a program.

When a reading target document is stored, a control unit 101 may create tracking information in information of a reading target document or map tracking information to a reading target document. In this case, when tracking information of a reading target document is already created, corresponding tracking information may be updated. Tracking information may be also created in a new document created from a reading target document. In this case, the tracking information may be the same as tracking information of a reading target document. When an event that tracking information is created occurs, corresponding tracking information may be stored in a memory 103 or may be transmitted to a server through a communication unit 102. Tracking information may be information recording from which document a corresponding document is created, etc. When a source of a new document is created from a server or an external device, tracking information may further include network traffic information of the server or the external device.

A communication unit 102, according to an instruction of a control unit 101, may transmit to a server at least one of information generated by a control unit 101 or information stored in a memory 103. In addition, a communication unit 102, according to an instruction of a control unit 101, may receive information stored in a server.

A memory 103, according to an instruction of a control unit 101, may store at least one of information generated by a control unit 101 or information received from a server. In addition, a memory 103, according to an instruction of a control unit 101, may transmit to a control unit 101 information stored in a memory 103 required by a control unit 101.

FIG. 3 is a flowchart for a method of maintaining meta information of a secure document according to an embodiment of the present disclosure.

A method of maintaining meta information of a secure document may include at least one of a step S301 of identifying a reading target document and acquiring information of the reading target document, a step S302 of identifying a window of a program that a reading target document is read and acquiring information of the window, a step S303 of mapping information of the window and information of the reading target document by using a regular expression for the program or a step S304 of mapping meta information of a secure document based on information of a reading target document. Specific contents for each step are the same as the above-described operation in a control unit, so they are omitted.

A method of creating test data according to an embodiment of the present disclosure may be implemented by a computer readable recording medium including a program instruction for performing a variety of operations implemented by a computer. The computer readable recording medium may include a program instruction, a local data file, a local data structure, etc. alone or in combination. The recording medium may be specially designed and configured for an embodiment of the present disclosure or may be used by being notified to those skilled in computer software. An example of a computer readable recording medium includes magnetic media such as a hard disk, a floppy disk and a magnetic tape, optical recording media such as a CD-ROM, a DVD, etc., magneto-optical media such as a floptical disk, and a hardware device which is specially configured to store and perform a program instruction such as ROM, RAM, a flash memory, etc. The recording medium may be a transmission medium such as an optical or metallic line, a wave guide, etc. including a carrier transmitting a signal designating a program instruction, a local data structure, etc. An example of a program instruction may include a high-level language code which may be executed by a computer using an interpreter, etc. as well as a machine language code generated by a compiler.

As a description above is just an illustrative description for a technical idea of the present disclosure, it may be changed and modified in various ways by those with ordinary skill in the art to which the present disclosure pertains within a scope not departing from an essential characteristic of the present disclosure. In addition, embodiments disclosed in the present disclosure are intended not to limit, but to explain a technical idea of the present disclosure, and a scope of a technical idea of the present disclosure is not limited by these embodiments. Accordingly, a protection scope of the present disclosure should be interpreted by claims below, and all technical ideas within a scope equivalent thereto should be interpreted as being included in a scope of a right of the present disclosure.

The invention claimed is:

1. A method of maintaining meta information for security, the method comprising:
   identifying a target document to be read through a program, and acquiring information of the target document;
   identifying a window of the program in which the target document is read, and acquiring information of the window, wherein the information of the window includes a caption name of the window;
   applying a regular expression for the program to the information of the window, and acquiring regular expression-applied information of the window;
   determining the target document as a document being read, based on at least a portion of the information of the target document matches to the regular expression-applied information of the window;
   mapping meta information for security and the document being read based on information of the target document; and
   mapping the meta information for security and a new document created from the target document being read,
   wherein a first regular expression is applied for a first program, and a second regular expression is applied for a second program, and
   wherein first regular expression-applied information of the window for the first program in which the target document is read is the same as second regular expression-applied information of the window for the second program in which the target document is read.

2. The method of claim 1, wherein:
   information of the target document includes key information, and
   the key information is any one of a window handle or a full path of the target document.

3. The method of claim 2, wherein:
   the at least a portion of the information of the target document includes the key information.

4. The method of claim 3, wherein:
   the mapping of the meta information for security and the document being read is performed by comparing the meta information for security with the key information of the document being read.

5. The method of claim 4, wherein:
   the mapping of the meta information for security and the document being read is performed only when the document being read is determined as a management target,
   whether the document being read is the management target is determined based on at least one of the information of the target document or the information of the window.

6. The method of claim 1, wherein:
   prior to applying the regular expression for the program to the information of the window, the regular expression for the program is generated by using the information of the target document and the information of the window.

7. The method of claim 1, wherein:
   the identifying of the target document is performed by any one of a first identification method, a second identification method, and a third identification method,
   the first identification method identifies the target document based on any one of a Commandline Parameter, a Dynamic Data Exchange (DDE) Parameter, a Drag-File or a Common Dialog,
   the second identification method identifies the target document based on at least one document that is opened at a current timepoint,
   the third identification method identifies the target document based on at least one document that has been read at or before the current timepoint.

8. The method of claim 7, wherein:
   the first identification method has a first priority,
   the second identification method is a method having a second priority performed when the target document is not identified by the first identification method having the first priority,
   the third identification method is the method having a third priority performed when the target document is not identified by the second identification method having the second priority.

9. The method of claim 1, wherein:
   when the new document is created from the document being read, tracking information of the target document is updated,
   the tracking information is created as information of the new document.

10. The method of claim 9, wherein:
    the new document is a document created by saving, saving as another name or exporting the document being read.

11. A device of maintaining meta information for security, the device comprising:
    a control unit configured to:
       identify a target document to be read through a program, and to acquire information of the target document;
       identify a window of the program in which the target document is read, and to acquire information of the window, wherein the information of the window includes a caption name of the window;
       apply a regular expression for the program to the information of the window, and to acquire regular expression-applied information of the window;

determine the target document as a document being read, based on at least a portion of the information of the target document matches to the regular expression-applied information of the window;

map meta information for security and the document being read based on information of the target document; and map the meta information for security and a new document created from the target document being read; and a memory for storing information generated by the control unit, wherein a first regular expression is applied for a first program, and a second regular expression is applied for a second program, and wherein first regular expression-applied information of the window for the first program in which the target document is read is the same as second regular expression-applied information of the window for the second program in which the target document is read.

12. A non-transitory computer readable recording medium, storing at least one instruction to cause a computer to perform operations to maintain meta information for security, the operations comprising:

identifying a target document to be read through a program, and acquiring information of the target document;

identifying a window of the program in which the target document is read, and acquiring information of the window, wherein the information of the window includes a caption name of the window;

applying a regular expression for the program to the information of the window, and acquiring regular expression-applied information of the window;

determining the target document as a document being read, based on at least a portion of the information of the target document matches to the regular expression-applied information of the window;

mapping meta information for security and the document being read based on information of the target document; and mapping the meta information for security and a new document created from the target document being read, wherein a first regular expression is applied for a first program, and a second regular expression is applied for a second program, and wherein first regular expression-applied information of the window for the first program in which the target document is read is the same as second regular expression-applied information of the window for the second program in which the target document is read.

* * * * *